United States Patent
Zdrojewski

(10) Patent No.: US 9,381,771 B2
(45) Date of Patent: Jul. 5, 2016

(54) RAILROAD WHEEL WITH WEAR RESISTANT FLANGE

(75) Inventor: Bogdan Roman Zdrojewski, Karowice (PL)

(73) Assignee: PLASMA SYSTEM S.A. (PL)

( * ) Notice: Subject to any disclaimer, the term of this patent is extended or adjusted under 35 U.S.C. 154(b) by 227 days.

(21) Appl. No.: 12/995,531

(22) PCT Filed: Jun. 4, 2009

(86) PCT No.: PCT/PL2009/000062
§ 371 (c)(1),
(2), (4) Date: Dec. 1, 2010

(87) PCT Pub. No.: WO2009/151345
PCT Pub. Date: Dec. 17, 2009

(65) Prior Publication Data
US 2011/0101717 A1    May 5, 2011

(30) Foreign Application Priority Data

Jun. 9, 2008    (PT) .......................................... 385392

(51) Int. Cl.
*B60B 17/00*    (2006.01)

(52) U.S. Cl.
CPC ......... *B60B 17/0068* (2013.01); *B60B 17/0006* (2013.01)

(58) Field of Classification Search
CPC ....................................................... B60B 17/00
USPC ............................................ 295/1, 30, 31.1
See application file for complete search history.

(56) References Cited

U.S. PATENT DOCUMENTS

| | | | | | |
|---|---|---|---|---|---|
| 104,792 | A | * | 6/1870 | Tarr | 295/30 |
| 141,011 | A | * | 7/1873 | Paige | 295/30 |
| 169,370 | A | * | 11/1875 | Paige | 295/30 |
| 261,183 | A | * | 7/1882 | Torre | 295/8 |
| 397,927 | A | * | 2/1889 | Melaney | 295/30 |
| 3,502,136 | A | * | 3/1970 | Nagin et al. | 164/430 |
| 3,661,571 | A | * | 5/1972 | Hintermann et al. | 419/2 |
| 4,669,390 | A | * | 6/1987 | Bisiach | 295/30 |
| 5,571,275 | A | * | 11/1996 | Cyr | 305/127 |
| 6,264,249 | B1 | * | 7/2001 | Fahl | 285/329 |
| 6,746,064 | B1 | * | 6/2004 | Petrek et al. | 295/1 |
| 6,844,085 | B2 | * | 1/2005 | Takayama et al. | 428/674 |

FOREIGN PATENT DOCUMENTS

| | | |
|---|---|---|
| CH | 231393 A | 3/1944 |
| CH | 385906 A | 12/1964 |
| DE | 19615245 A1 | 10/1997 |
| GB | 1475976 A | 6/1977 |

(Continued)

OTHER PUBLICATIONS

International Search Report dated Oct. 20, 2009, issued in corresponding international application No. PCT/PL2009/000062.

(Continued)

*Primary Examiner* — Jason Bellinger
(74) *Attorney, Agent, or Firm* — Ostrolenk Faber LLP

(57) ABSTRACT

A railroad wheel has a wear resistant flange (3) or tire or rim, comprising the surfaces, which can touch the rail during travelling. On the circumferential outer surface (4) of flange (3) of the wheel (2) an anti-abrasion layer (1) is placed in a durable manner.

13 Claims, 1 Drawing Sheet

(56) References Cited

FOREIGN PATENT DOCUMENTS

GB 1566589 A 5/1980
WO WO 95/09736 4/1995

OTHER PUBLICATIONS

M. Sitarz et al., "Application of elastohydrodynamic theories of lubrication to rail/wheel systems with curved tracks", Technical University of Silesia—fascicle 22 (transport) pp. 198-215 (1994).
Z. Romaniszyn, "Running gears of track-vehicles," Ed. Technical University of Kraków (2005).
"Dictionary of Scientific and Technical Terms," McGraw-Hill Book Company, pp. 195 and 1111, 1974.
"Dictionary of Metals and Alloys, Their Composition and Characteristics," by F.J. Camm, pp. 25 and 91, 1945.

"Copper and its Alloys," by Ellis Horwood Limited, pp. 108 and 110, 1982.
"Copper & Copper Alloy Castings Properties & Applications," by Copper Development Association, Publication TN42, 1991.
"Equilibrium Diagrams, Selected copper alloy diagrams illustrating the major types of phase transformation" by Copper Development Association, CDA Publication No. 94, pp. 23-26, 1992.
"Phosphor Bronzes," The world's most comprehensive materials database, URL address: http://www.keytometals.com/page.aspx?ID=CheckArticle&site=ktn&NM=143, Mar. 2006.
"Physical Metallurgy," by William F. Hosford, pp. 240-241, 2005.
"Henley's Twentieth Century Book of Recipes, Formulas and Processes" by Gardner D. Hiscox, pp. 58-61, 1909.
Martin Robert Karig III, "Coal Cars, The First Three Hundred Years," pp. 164-168, University of Scranton Press, 2007.

\* cited by examiner

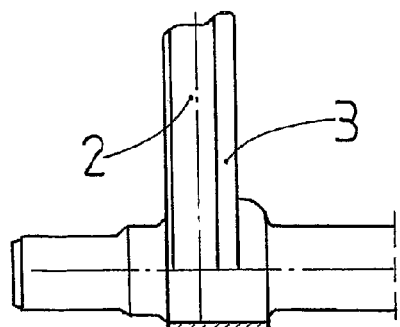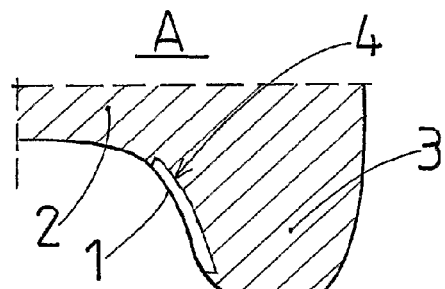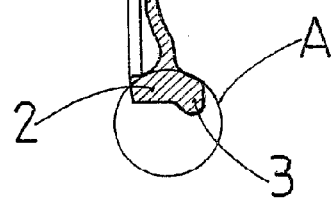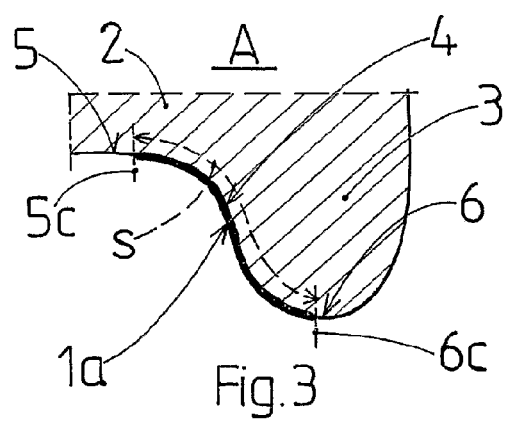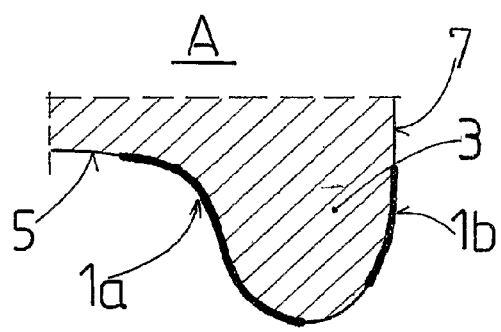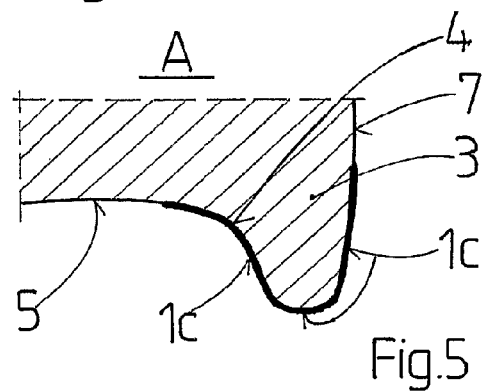

RAILROAD WHEEL WITH WEAR RESISTANT FLANGE

CROSS REFERENCE TO RELATED APPLICATIONS

The present application is a 35 U.S.C. §371 National Phase conversion of PCT/PL2009/000062, filed Jun. 4, 2009, which claims benefit of Polish Application No. P-385 392, filed Jun. 9, 2008, the disclosure of which is incorporated herein by reference. The PCT International Application was published in the English language.

BACKGROUND OF THE INVENTION

1. Field of the Invention

The subject of the invention is a railroad wheel with a wear resistant flange used in the different kinds of rail transport: railways, trams and mine transport.

2. Background Art

In railway engineering serious problems occur with excessive grinding of the lateral surfaces of flanges of wheel rims. The smallest offset of wheel sets in a rail track results in rolling of wheels along circles having different radii and in consequence results in a change of the angle of attack of a wheel onto the rails. During rolling of axle sets on a straight track, the wheel flanges in principle do not touch the rails at definite speeds, but on curves at high speeds considerable friction results between these flanges and a head of the rail, which results in high grinding and thus to wear, also called undercutting of these flanges (sharp flanges), which could even threaten travelling safety in railway transport.

The steady quiet running of the rail-vehicle, the travelling safety, and the noise level emitted while a vehicle is travelling on the track, as well as the interval of time between subsequent very expensive repairs of the wheel sets depends in large measure on the geometrical features of the rolling profile. Within the framework of these repairs to the wheel sets, the railroad wheels are re-profiled in order to restore the correct dimensions of the wheel sets.

Up to now, for example, in order to reduce the grinding of the wheel flanges and to prolong the overhaul intervals, different kinds of lubricants and devices for lubrication of the above mentioned wheel flanges and rails have been used, particularly on the curves in the track.

From the analytical & theoretical publication, "Application of elastohydrodynamic theories of lubrication to rail/wheel systems with curved tracks", Technical University of Silesia—fascicle 22 (transport), M. Sitarz, H. P. Evans—1994, the elastohydrodynamic lubrication of railroad wheel flanges is known during travelling on curves in a track with high external loads. It is foreseen, that such lubrication of the wheel-rail system can reduce the wear of rails and wheels 5-7 times and reduce the fuel consumption by about 30%. Such foreseen results of reduced wear and fuel consumption are based on numerical calculations that the biggest changes in oil film thickness occur within the radius range R=(13-15) mm.

The publication, "Running gears of track-vehicles", Z. Romaniszyn, Ed. Technical University of Krakow, 2005, discloses known devices for lubrication of wheel flanges using oils, sticky greases or solid oils. The latter comprise inserts manufactured from polymer-stabilized constituents, enabling obtainment of low friction factor values, ranging from 0.06 to 0.1, which are insensitive to variations within a wide temperature range. The known lubricant application devices also include, among other things, an appliance consisting mostly of an electronic control system, connected with a transmitter of a speedometer, a feeding conduit, an oil tank, a pneumatic solenoid valve, a spraying device and low-pressure oil and air pipes. The primary task of the electronic control system is controlling the pneumatic and hydraulic part of the lubrication system, which lubricates the borders of rail and wheel surfaces. The operating personnel of a track-vehicle chooses the track sections requiring activation or stoppage of the above mentioned lubricating system.

The hitherto existing methods and devices aiming at increasing the durability of railroad wheels by lubricating the flanges of the latter are difficult and troublesome ones. The common disadvantage of these solutions is imperfect devices and control systems to determine the dosage of lubricant. The lubrication of the wheel flange should be performed at a close distance to the beginning of the curve in the track in an exactly determined place, that is on the wheel flange. An inaccurate supply of lubricant will not fulfill the required task, and, in addition, the grease could flow onto the rolling surfaces of the railroad wheels producing disturbances in vehicle braking.

SUMMARY OF THE INVENTION

The purpose of the present invention is the exclusion of lubrication of the wheel flange surfaces in contact with a rail, especially on curves in the track, in order to reduce the cost of repairs and re-profiling of the wheel sets due to excessive grinding.

In accordance with the present invention this purpose is successfully accomplished. The essence of the invention consists in the placing of a durable anti-abrasion layer on the circumferential inner and/or outer surface of the wheel flange. The circumferential anti-abrasion layer spreads advantageously in its width to the fore-part of the rolling surface of the railroad wheel from one side, and to the fore-part of the radially outer periphery of the flange from the other side. On the surface of the outer side of said flange is placed additionally a durable circumferential anti-abrasion layer. The circumferential anti-abrasion layer is placed in a durable manner around the whole flange tip and on its inner and outer lateral initial sections.

The application of the durable anti-abrasion layer can increase 5 to 7 times the lifetime of the wheel flanges and their profile, reduce energy consumption by about 30% when travelling on curves in the track, reduce emission of noise in the form of squeaks, and improve the travelling safety by reducing the derailment threat during running at the curves and switch turnouts.

BRIEF DESCRIPTION OF THE DRAWINGS

The subject of the present invention is shown in the form of embodiments in the figures, wherein FIG. 1. shows in a lateral view and in a broken-out section a portion of the running wheel set and FIGS. 2 to 5 show enlarged alternate embodiments of detail A designated in FIG. 1, which represent the embodiments of the railroad wheel including its wear resistant flange, with respect to the kind of use of the railroad wheel.

DESCRIPTION OF PREFERRED EMBODIMENTS

In accordance with the invention (FIG. 2), on the circumferential inner surface 4 of flange 3 of the wheel 2 is placed in a durable manner the anti-abrasion layer 1. Depending on the need, for a given kind of transport means, bronze, TEFLON (polytetrafluoroethylene), bronze with graphite and/or molybdenum disulfide, for example, can be advantageously used for the anti-abrasion layer. As shown in FIG. 3, the circumferential anti-abrasion layer 1a spreads advantageously in its width to the fore-part 5c of the rolling surface 5 of the railroad wheel 2 on one side, and to the fore-part 6c of the radially outer periphery 6 of the flange 3 on the other side. FIG. 4 shows an additional durable layer 1b placed on the outer surface 7 of the flange 3. In FIG. 5 an optional structure has been represented, for example for the tram lines, where the circumferential anti-abrasion layer 1c is placed on the surface around the whole tip 6 of flange 3 and on its lateral outer and inner surfaces and 4.

What is claimed is:

1. A railroad wheel with a wear resistant wheel flange, the railroad wheel comprising a rolling surface of the railroad wheel, the wheel flange having wheel flange surfaces, the wheel flange surfaces making a frictional contact with a rail during traveling of the railroad wheel on the rail,
   wherein an anti-abrasion layer, made of at least one of a group of materials consisting of: bronze, polytetrafluoroethylene, bronze with graphite, and molybdenum disulfide, is placed directly on at least a curved circumferential outer surface of the wheel flange of the railroad wheel outside of the rolling surface of the railroad wheel,
   the anti-abrasion layer is completely outside of the rolling surface of the railroad wheel, and
   the curved circumferential outer surface of the wheel flange of the railroad wheel is curved over at least the entire length of the anti-abrasion layer,
   whereby grinding of the wheel flange caused by contact of the wheel flange with a railroad rail is reduced without the use of any liquid lubricants, the service life of the wheel flange is prolonged and the energy consumption and noise caused by travel of the railroad wheel over a railroad rail is reduced.

2. The railroad wheel according to claim 1, wherein the circumferential anti-abrasion layer spreads on the circumferential outer surface of the wheel flange to a fore-part of a rolling surface of the railroad wheel from one side, and to a fore-part of a radially outer periphery of the wheel flange from the other side.

3. The railroad wheel according to claim 2, wherein a second circumferential anti-abrasion layer is placed additionally on a circumferential inner surface of the wheel flange.

4. The railroad wheel according to claim 1, wherein the anti-abrasion layer is placed on surfaces around a radially outer periphery of the wheel flange and on lateral outer and inner surfaces of the wheel flange.

5. A railroad wheel with a wear resistant wheel flange, the railroad wheel comprising a rolling surface of the railroad wheel, the wheel flange having wheel flange surfaces, the wheel flange surfaces making a frictional contact with a rail during traveling of the railroad wheel on the rail,
   wherein an anti-abrasion layer is placed directly on a curved surface of the wheel flange of the railroad wheel and the curved surface of the wheel flange of the railroad wheel is curved over at least the entire length of the anti-abrasion layer, both ends of the anti-abrasion layer being in a circumferential outer surface of the wheel flange outside of the rolling surface of the railroad wheel, and
   the anti-abrasion layer is completely outside of the rolling surface of the railroad wheel.

6. The railroad wheel according to claim 5, wherein the anti-abrasion layer is made of at least one of a group of materials consisting of: bronze, polytetrafluoroethylene, bronze with graphite, and molybdenum disulfide.

7. The railroad wheel according to claim 6, wherein the at least one of the group of materials is bronze.

8. A railroad wheel with a wear resistant wheel flange, the railroad wheel comprising a rolling surface of the railroad wheel, the wheel flange having wheel flange surfaces, the wheel flange surfaces making a frictional contact with a rail during traveling of the railroad wheel on the rail,
   wherein an anti-abrasion layer is placed directly on a curved surface of the wheel flange of the railroad wheel and the curved surface of the wheel flange of the railroad wheel is curved over at least the entire length of the anti-abrasion layer, one end of the anti-abrasion layer being in a first border region between the rolling surface of the railroad wheel and a circumferential outer surface of the wheel flange and the other end of the anti-abrasion layer being in a second border region between the circumferential outer surface of the wheel flange and the radially outer periphery of the wheel flange, the anti-abrasion layer being outside of the rolling surface of the railroad wheel, and
   the anti-abrasion layer is completely outside of the rolling surface of the railroad wheel.

9. The railroad wheel according to claim 8, wherein the anti-abrasion layer is made of at least one of a group of materials consisting of: bronze, polytetrafluoroethylene, bronze with graphite, and molybdenum disulfide.

10. The railroad wheel according to claim 9, wherein the at least one of the group of materials is bronze.

11. The railroad wheel according to claim 1, wherein the curved circumferential outer surface of the wheel flange of the railroad wheel is curved over at least the entire length of the anti-abrasion layer in a cross-section of the railroad wheel.

12. The railroad wheel according to claim 5, wherein the curved surface of the wheel flange of the railroad wheel is curved over at least the entire length of the anti-abrasion layer in a cross-section of the railroad wheel.

13. The railroad wheel according to claim 8, wherein the curved surface of the wheel flange of the railroad wheel is curved over at least the entire length of the anti-abrasion layer in a cross-section of the railroad wheel.

* * * * *